United States Patent
Parker, Jr. et al.

(10) Patent No.: US 8,209,554 B2
(45) Date of Patent: Jun. 26, 2012

(54) APPLYING POWER MANAGEMENT ON A PARTITION BASIS IN A MULTIPARTITIONED COMPUTER SYSTEM

(75) Inventors: Christopher Stephen Parker, Jr., Byron, MN (US); Nathan Allan Rabe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 12/390,850

(22) Filed: Feb. 23, 2009

(65) Prior Publication Data

US 2010/0218018 A1    Aug. 26, 2010

(51) Int. Cl.
     G06F 1/26    (2006.01)
(52) U.S. Cl. .................. 713/300; 713/320
(58) Field of Classification Search .......... 713/300, 713/320
     See application file for complete search history.

(56) References Cited

U.S. PATENT DOCUMENTS

| | | | |
|---|---|---|---|
| 6,901,522 B2* | 5/2005 | Buch | 713/320 |
| 7,334,142 B2* | 2/2008 | Hack | 713/320 |
| 7,356,665 B2 | 4/2008 | Rawson, III | |
| 7,426,625 B2 | 9/2008 | Lee | |
| 7,702,936 B2* | 4/2010 | Hack | 713/320 |
| 7,739,527 B2* | 6/2010 | Rothman et al. | 713/320 |
| 8,010,822 B2* | 8/2011 | Marshall et al. | 713/324 |
| 2004/0111596 A1* | 6/2004 | Rawson, III | 713/1 |
| 2006/0136761 A1* | 6/2006 | Frasier et al. | 713/320 |
| 2006/0259730 A1 | 11/2006 | Gimpl et al. | |
| 2008/0148254 A1 | 6/2008 | Hofer et al. | |

OTHER PUBLICATIONS

Brad Behle et al., "IBM EnergyScale for POWER6 Processor-Based Systems", International Business Machines Corporation, Armonk, NY, Nov. 2008, pp. 1-88.

* cited by examiner

Primary Examiner — Nitin Patel
(74) Attorney, Agent, or Firm — Matthew J. Bussan

(57) ABSTRACT

A partition power policy wizard receives power policy adherence information for at least one of a plurality of logical partitions (LPAR) and calculates a processing units allotment (PUA) for each LPAR based on the power policy adherence information. In one embodiment, a power management policy reduces an operating frequency of one or more processor(s) allocated to a plurality of LPARs. The power policy adherence information, which is input via a graphical user interface (GUI), specifies whether each LPAR is to be impacted by the power management policy, and if so, by how much. The PUA calculated for each LPAR by the partition policy wizard rebalances the processing units allocated to the individual LPARs to accommodate the power policy adherence information input by the user. Preferably, the partition power policy wizard includes a validation mechanism to validate the executability and/or advisability of each PUA so calculated.

16 Claims, 12 Drawing Sheets

APPLYING POWER MANAGEMENT ON A PARTITION BASIS IN A MULTIPARTITIONED COMPUTER SYSTEM

BACKGROUND OF THE INVENTION

1. Field of Invention

The present invention relates in general to the data processing field. More particularly, the present invention relates to a method, apparatus and computer program product for applying power management on a partition basis in a multipartitioned computer system.

2. Background Art

Computer systems typically include a combination of hardware and software. The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources into different computing environments. Such a computer system is often referred to as a multipartitioned computer system. The IBM System i computer system developed by International Business Machines Corporation is an example of a computer system that supports logical partitioning. If logical partitioning on an IBM System i computer system is desired, partition manager code (referred to as a "hypervisor" in IBM terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources (e.g., processors, memory, persistent storage, and other physical hardware) amongst the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

Many modern computer systems (e.g., server systems) have the capability of performing power management functions, often referred to as power management policies, in order to save energy and reduce cost. Power capping and power saving are examples of such power management policies that limit power consumption of a particular computer system. However, many modern computer systems also have the capability of being partitioned, as discussed above, with resources (including processing power) being virtualized across each partition. Applying conventional power management policies to a multipartitioned computer system has the effect of applying the power management policies to all partitions on the computer system.

For example, applying conventional power management policies in a multipartitioned server system with one physical processor (i.e., a single CPU) and four partitions has the effect of applying the power management policies to all four partitions on the system because each partition utilizes the same physical processor. This system-wide, all-partitions effect occurs even though conventional logical partitioning management typically provides a mechanism for the user to decide how much of the processor (often referred to as "processing units" or "virtual processor units") gets virtually allocated to each partition. If this exemplary server system is subject to a conventional power management policy that, for example, reduces the total number of processing cycles (which is typically accomplished by reducing processor frequency and voltage), each of the four partitions would be affected in proportion to the amount of processor virtually allocated to that partition.

In the exemplary server system above, each partition has a varying level of power consumption; this is a function of the intensiveness of the processes running on the partition, but mostly is a function of the number of processing units assigned to each partition. If the exemplary server system were managed by a system-wide power management policy, all partitions' power consumption would be reduced. It is important, however, to note that all partitions' efficiency would be reduced as well. This is undesirable if one or more of the partitions is/are running important workloads having processes that should not be subject to reduced efficiency.

Therefore, a need exists for an enhanced mechanism for applying power management on a partition basis in a multipartitioned computer system.

SUMMARY OF THE INVENTION

According to the preferred embodiment of the present invention, a partition power policy wizard receives power policy adherence information for at least one of a plurality of logical partitions (LPAR) and calculates a processing units allotment (PUA) for each LPAR based on the power policy adherence information. A power management policy reduces an operating frequency of one or more processor(s) allocated to a plurality of LPARs. The power policy adherence information, which is input via a graphical user interface (GUI), specifies whether each LPAR is to be impacted by the power management policy, and if so, by how much. The PUA calculated for each LPAR by the partition policy wizard rebalances the processing units allocated to the individual LPARs to accommodate the power policy adherence information input by the user. Preferably, the partition power policy wizard includes a validation mechanism to validate the executability and/or advisability of each PUA so calculated.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS

1. Overview

In accordance with the preferred embodiments of the present invention, a partition power policy wizard receives power policy adherence information for at least one of a plurality of logical partitions (LPARs) and calculates a processing units allotment (PUA) for each LPAR based on the power policy adherence information. A power management policy reduces an operating frequency of one or more processor(s) allocated to a plurality of LPARs. The power policy adherence information, which is input via a graphical user interface (GUI), specifies whether each LPAR is to be impacted by the power management policy, and if so, by how much. The PUA calculated for each LPAR by the partition policy wizard rebalances the processing units allocated to the individual LPARs to accommodate the power policy adherence information input by the user. Preferably, the partition power policy wizard includes a validation mechanism to validate the executability and/or advisability of each PUA so calculated.

2. Detailed Description

In the embodiment shown in FIG. 1, described further below, the computer system 100 is a logically-partitioned platform. For those not familiar with the concepts of logical partitions, background information is provided below with reference to FIGS. 2-4 that will help to understand the present invention.

Figure 2:
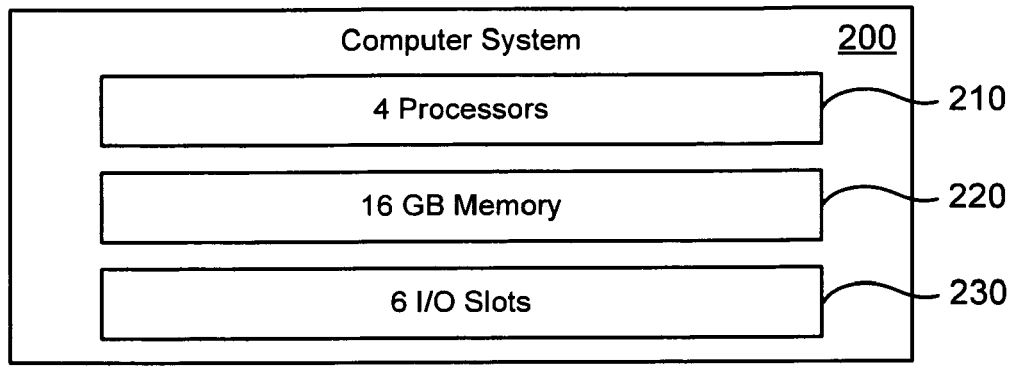
FIG. 2 is a block diagram of a prior art computer system before logical partitioning.
Figure 3:
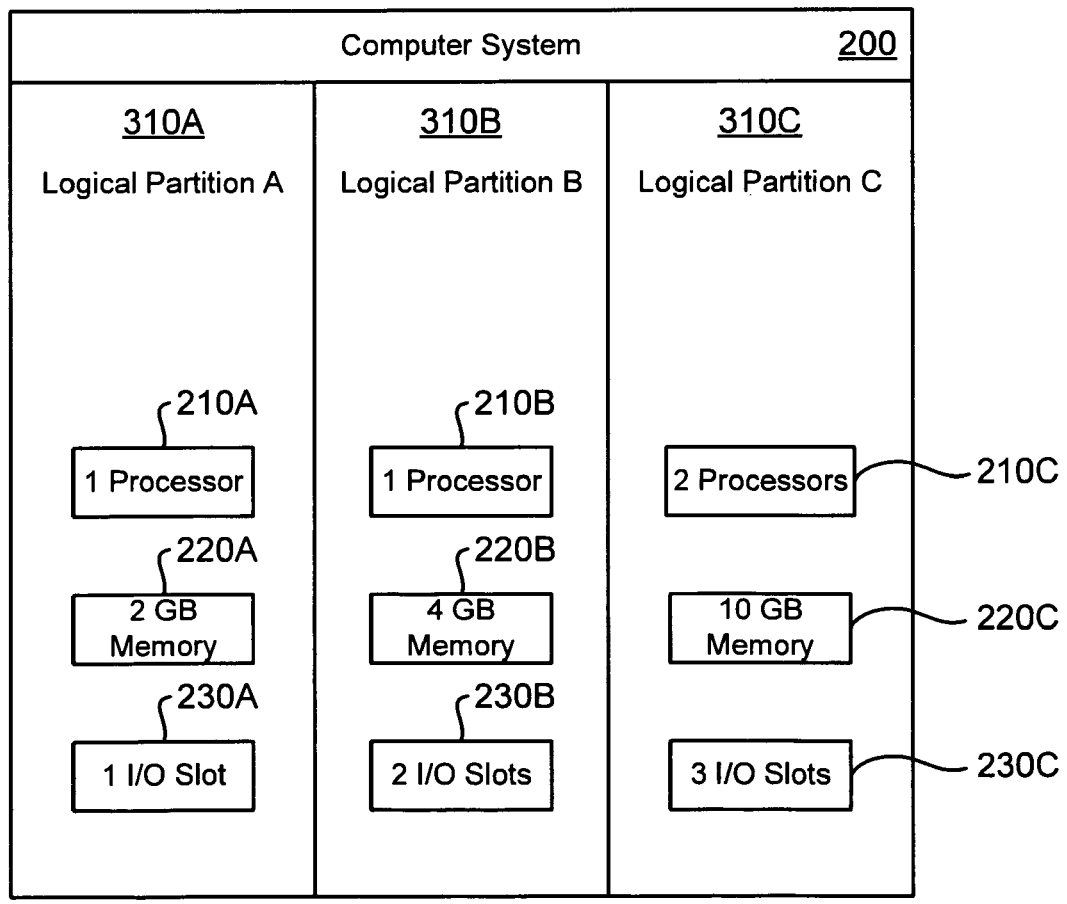
FIG. 3 is a block diagram of the prior art computer system in FIG. 2 after logical partitioning.

As stated in the Background Art section above, a computer system may be logically partitioned to create multiple virtual machines on a single computer platform. Referring to FIG. 2, a sample computer system 200 is shown to include four processors 210, 16 GB of main memory 220, and six I/O slots 230. Note that there may be many other components inside a prior art computer system that are not shown in FIG. 2 for the purpose of simplifying the discussion herein. We now assume that the computer system 200 is configured with three logical partitions, as shown in FIG. 3. The first logical partition 310A is defined to have one processor 210A, 2 GB of memory 220A, and one I/O slot 230A. The second logical partition 310B is defined to have one processor 210B, 4 GB of memory 220B, and two I/O slots 230B. The third logical partition 310C is defined to have two processors 210C, 10 GB of memory 220C, and three I/O slots 230C. Note that the total number of processors (210A+210B+210C) equals the four processors 210 in the computer system 200. Likewise for the memory and the I/O slots.

Figure 4:
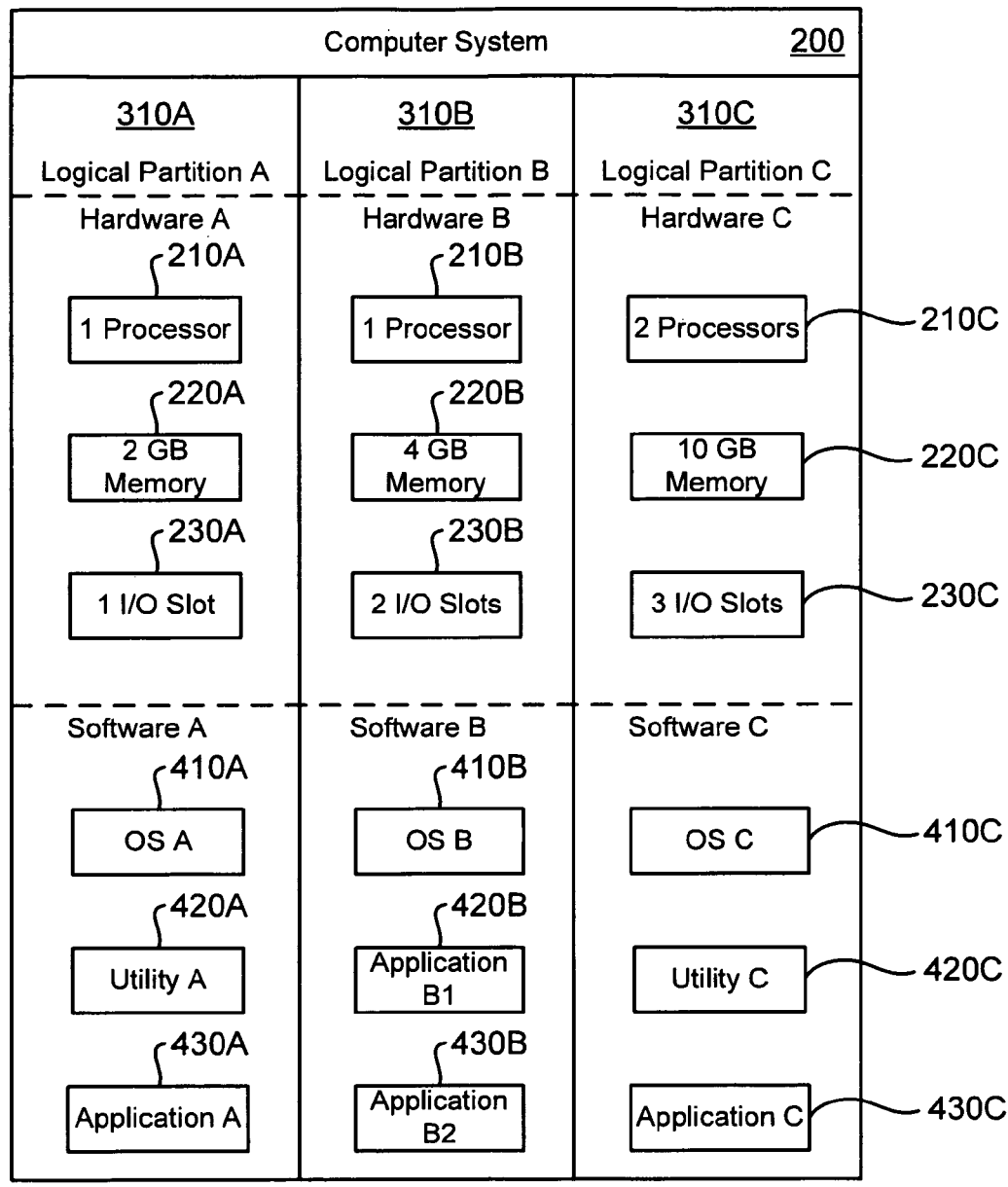
FIG. 4 is a block diagram of the prior art computer system in FIG. 3 after installing an operating system and other software in each logical partition.

Now that hardware resources have been allocated to the logical partitions, software may be installed, as shown in FIG. 4. First, an operating system is typically installed in each partition, followed by utilities or applications as the specific performance needs of each partition require. Thus, for example in FIG. 4, the first logical partition 310A includes an operating system 410A, a utility 420A, and an application 430A. The second logical partition 310B includes an operating system 410B, and two applications 420B and 430B. The third logical partition 310C includes an operating system 410C, a utility 420C, and an application 430C. Once the software is installed in the logical partitions as shown in FIG. 4, the logically-partitioned computer system 200 is ready for use.

A computer system implementation of the preferred embodiments of the present invention will now be described with reference to FIG. 1 in the context of a particular computer system 100, i.e., an IBM System i computer system. However, those skilled in the art will appreciate that the method, apparatus, and computer program product of the present invention apply equally to any computer system, regardless of whether the computer system is a complicated multi-user computing apparatus (e.g., an IBM POWER6 processor-based server system or an IBM POWER6 processor-based blade system residing in an IBM BladeCenter chassis), a single user workstation, a PC, or an embedded control system. As shown in FIG. 1, computer system 100 comprises one or more processors 101A, 101B, 101C and 101D, a main memory 102, a mass storage interface 104, a display interface 106, a network interface 108, and an I/O device interface 109. These system components are interconnected through the use of a system bus 110.

Partition management code 120, described further below, resides in the main memory 102 and performs a number of multipartitioning functions and services for a plurality of partitions in the computer system 100.

Energy management code 122, described further below, resides in the main memory 102 and performs power management functions (also referred to herein as "power management policies" and "power policies") in the computer system 100 in order to save power and reduce cost. Power saving and power capping are examples of such power management policies. Typically, such power management policies limit power consumption of the computer system 100 by reducing an operating frequency of the one or more processors 101A, 101B, 101C and 101D. Applying conventional power management policies to a multipartitioned computer system, such as the computer system 100, has the effect of applying the power management policies to all partitions in the computer system. As a consequence, the power consumption of all partitions in the computer system is reduced, but at the cost of reducing the efficiency of all partitions in the computer system. This is undesirable if one or more of the partitions is/are running important workloads having processes that should not be subject to reduced efficiency.

In accordance with the preferred embodiments of the present invention, a partition power policy wizard 124, described further below, resides in the main memory 102 (at least in the embodiment shown in FIG. 1) and operates in conjunction with the partition management code 120 and the energy management code 122 to rebalance the processing units allocated to the individual partitions to limit the impact of the power management policy on a selected one or more of the partitions.

Also, in accordance with the preferred embodiments of the present invention, the partition power policy wizard 124 includes a validation mechanism 126, described further below, that validates the executability and/or advisability of the rebalanced allocation of processing units to the individual partitions.

Figure 1:
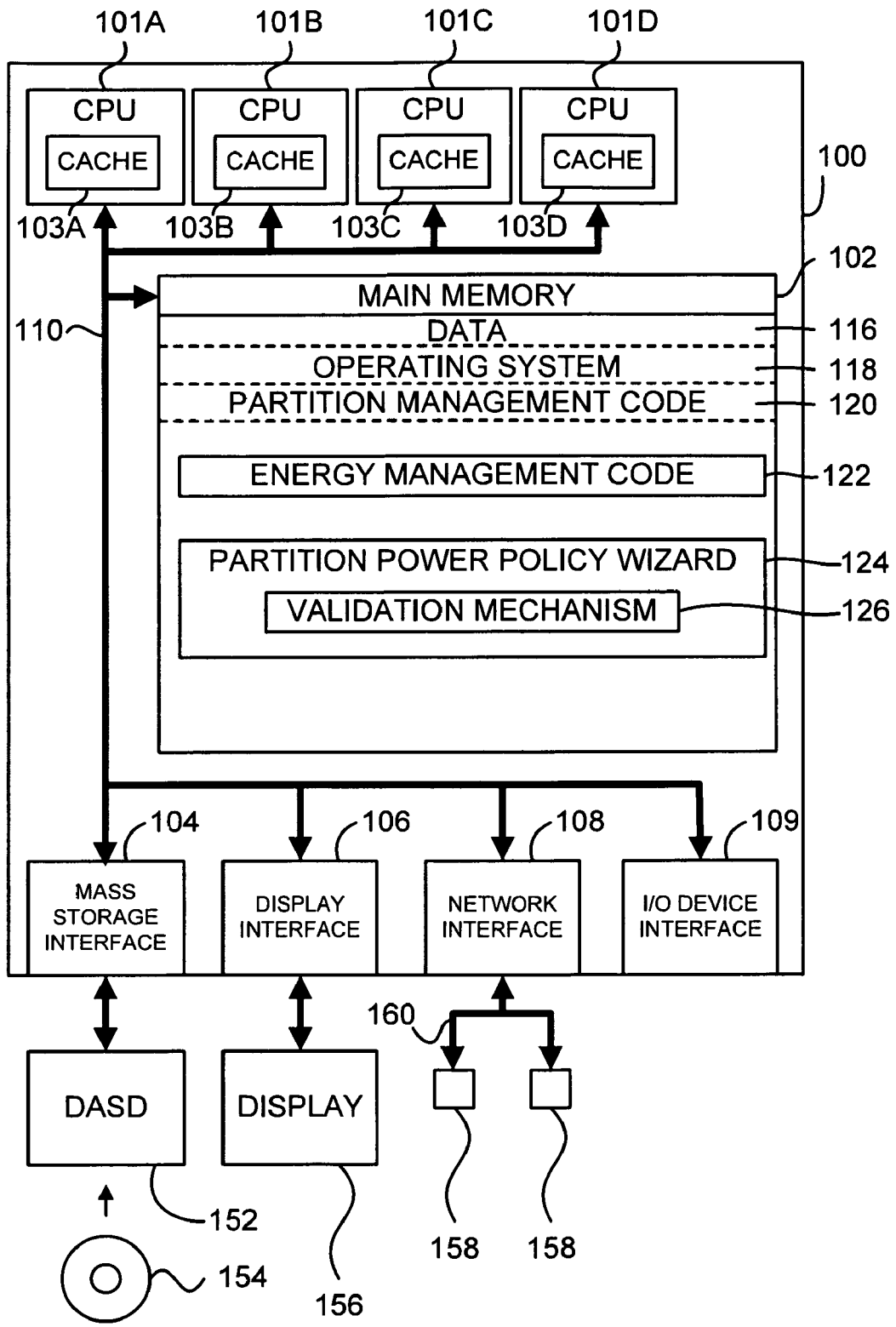
FIG. 1 is a block diagram illustrating a computer apparatus for implementing a mechanism for applying power management on a partition basis in a multipartitioned computer system in accordance with the preferred embodiments of the present invention.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with the preferred embodiments contains data 116, an operating system 118 and application software, utilities and other types of software. In addition, main memory 102 includes the partition management code 120, the energy management code 122, and the partition power policy wizard 124 with the validation mechanism 126, each of which may in various embodiments exist in any number. Each of these entities in memory is described further below.

Although the partition management code 120, the energy management code 122, the partition power policy wizard 124, and the validation mechanism 126 are illustrated as being contained within the main memory 102, in other embodiments some or all of them may be on different electronic devices and may be accessed remotely (e.g., via the network 160). Thus, for example, the partition power policy wizard 124 and the validation mechanism 126 may be located on a networked device (e.g., a computer system and/or workstation 158), while the partition management program 120 and the energy management code 122 reside on the computer system 100.

The preferred embodiments expressly extend to the partition power policy wizard 124 and the validation mechanism 126 being implemented within an energy management tool on a networked device (e.g., the computer system 518 shown in FIG. 5, or the computer system 618 shown in FIG. 6) within the scope of the preferred embodiments. For example, the partition power policy wizard 124 and the validation mechanism 126 may be implemented within Active Energy Manager, available from International Business Machines Corporation, running with IBM Systems Director on a networked computer system.

The partition management code 120 represents any code that is responsible for performing multipartitioning functions and services for partitions in the computer system 100. The partition management code 120 may be, for example, a "hypervisor", which is available from International Business Machines Corporation.

While the partition management code 120 is shown in FIG. 1 as a separate entity in memory, the preferred embodiments expressly extend to the partition management code 120 being implemented within the operating system 118, application software, utilities, or other types of software within the scope of the preferred embodiments. For example, the partition management code 120 may be a layer of the operating system 118 responsible for performing multipartitioning functions.

The partition management code 120 may comprise computer executable instructions maintained, for example, as a computer program product stored on a hard disk (e.g., on a DASD device 152) or system firmware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

In another embodiment, the partition management code 120 may be implemented in hardware via logic gates and/or other appropriate hardware techniques in lieu of, or in addition to, a processor-based system.

The energy management code 122 represents any code that is responsible for providing power management functions (also referred to herein as "power management policies" and "power policies") in the computer system 100 in order to save power and reduce cost. Power saving and power capping are examples of such power management policies. Typically, such power management policies limit power consumption of the computer system 100 by reducing an operating frequency of the one or more processors 101A, 101B, 101C and 101D.

The energy management code 122 may be, for example, IBM EnergyScale, which is available from International Business Machines Corporation. IBM EnergyScale technology, developed for the IBM POWER6 processor-based systems, provides functions (e.g., power trending, thermal reporting, Static Power Saver, Dynamic Power Saver, power capping, soft power capping, etc.) that help the user to understand and control IBM server power and cooling usage. Several exemplary EnergyScale functions are briefly described below. For more details on EnergyScale functions, see Brad Behle et al., "IBM EnergyScale for POWER6 Processor-Based Systems", International Business Machines Corporation, Armonk, N.Y., November 2008, pp. 1-88, which is incorporated herein by reference.

Figure 5:
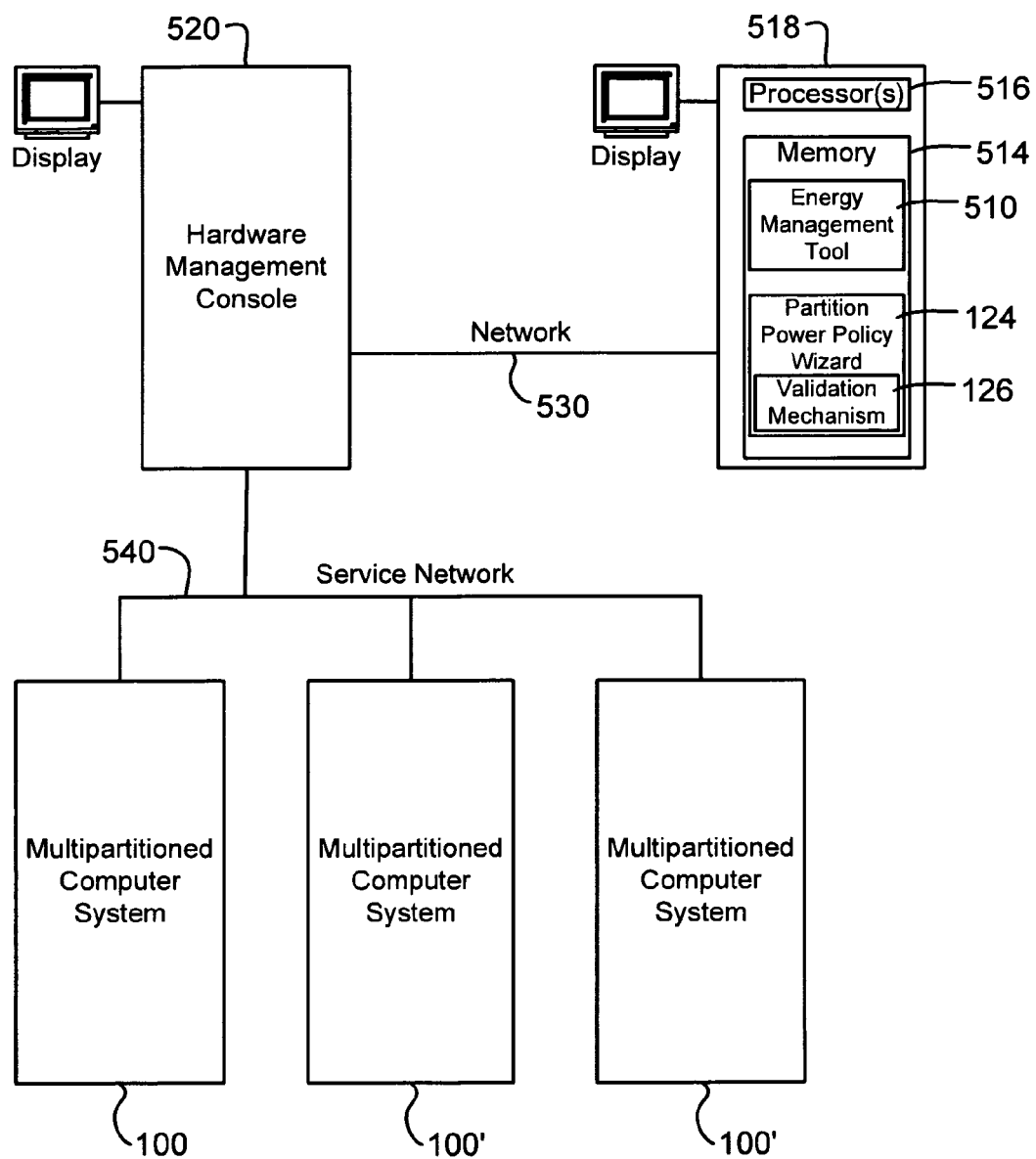
FIG. 5 is a block diagram illustrating a computer apparatus for implementing a mechanism for applying power management on a partition basis in one or more multipartitioned computer systems in accordance with the preferred embodiment of the present invention, wherein the one or more multipartitioned computer systems is/are hardware management console (HMC) managed.
Figure 6:
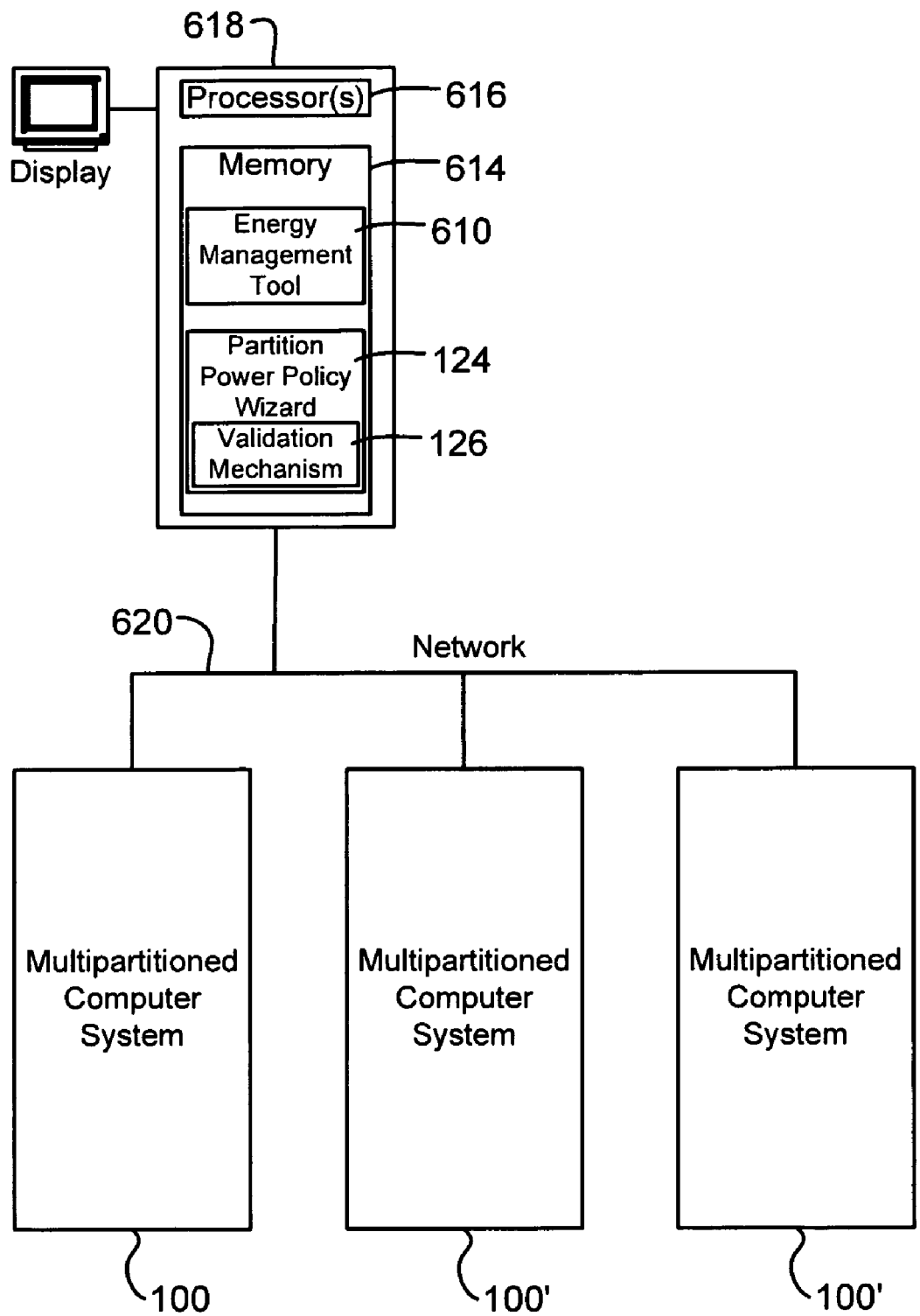
FIG. 6 is a block diagram illustrating another computer apparatus for implementing a mechanism for applying power management on a partition basis in one or more multipartitioned computer systems in accordance with the preferred embodiment of the present invention, wherein the one or more multipartitioned computer systems is/are non-HMC managed.

Static Power Saver (Power Saver mode) lowers the processor frequency and voltage on a system by a fixed amount, thereby reducing the power consumption of the system while still delivering predictable performance. For example, when the Power Saver mode is enabled, the energy management code 122 lowers the frequency of the processors 101 in the computer system 100 by a fixed amount (e.g., 25%) to achieve a processor power savings (e.g., approximately 35-45%). Typically, an energy management tool (e.g., Active Energy Manager), which is described further below with reference to FIGS. 5 and 6, provides a user interface to enable/disable the Power Saver mode. Also, a user can access the Power Saver mode via a web browser session on a networked device.

Dynamic Power Saver varies processor frequency and voltage based on the utilization of the system's POWER6 processors. For example, when the computer system 100 is idle, the energy management code 122 lowers the frequency of the processors 101 in the computer system 100 to the Static Power Saver value. On the other hand, when the computer system 100 is fully-utilized, the energy management code 122 raises the frequency of the processors 101 to a maximum frequency, which may vary depending on whether the user favors power savings or system performance. Typically, an energy management tool (e.g., Active Energy Manager), which is described further below with reference to FIGS. 5 and 6, provides a user interface to enable/disable the Dynamic Power Saver and configure its settings.

Power capping enforces a user specified limit on power consumption. Typically, an energy management tool (e.g., Active Energy Manager), which is described further below with reference to FIGS. 5 and 6, provides a user interface to set and enable a power cap. There are two power ranges into which the power cap may be set, i.e., a guaranteed range and a soft range beyond the guaranteed range. When the power cap is set in the guaranteed range, the power management policy (EnergyScale function) is referred to as "power capping". When the power cap is set in the soft range, the power management policy (EnergyScale function) is referred to as "soft power capping".

In most data centers and other installations, when a computer system is installed, a certain amount of power is allocated to that computer system. Generally, the amount of power allocated to the computer system is what is considered to be a "safe" value (e.g., the Underwriter's Laboratories (UL) rating on the back of the computer system, commonly referred to as "label power"), and it typically has a large margin of reserved, extra power that is never used. This is called "margined power". The main purpose of the power cap is not to save power but rather to allow a data center operator the ability to reallocate power from the current systems to new systems by reducing the margin assigned to the existing systems. That is, power capping allows an operator the ability to add one or more extra systems to a data center which previously had all available power allotted to its current systems. Power capping does this by guaranteeing that a system will not use more power than assigned to the system by the operator.

When a power cap is set in the guaranteed range, the computer system is guaranteed to use less power than the cap setting. In order to guarantee this, extreme system configuration and environmental conditions must be accounted for. Setting a power cap in this guaranteed region allows for recovery of margined power, but in many cases cannot be used to save power. Soft power capping extends the allowed power capping range further, beyond a region that can be guaranteed in all configurations and conditions. By setting a power cap in this soft region, the system can be set to save power by running at a lower power/performance point. If the power management goal is to meet a particular power consumption limit, soft power capping is typically the mechanism of choice. The performance impacts of a particular power cap setting can be determined using the power and CPU information displayed on Active Energy Manager.

Irrespective of the type of power capping (e.g., power capping and soft power capping) utilized, power capping enforces a user specified limit on the power consumption of the computer system 100, typically by reducing an operating frequency of the processors 101.

The various power management policies described above are exemplary. The present invention does not require any particular type of power management policy and may be used in conjunction with any energy management code performing any type of power management policy.

While the energy management code 122 is shown in FIG. 1 as a separate entity in memory, the preferred embodiments expressly extend to the energy management code 122 being implemented within the operating system 118, application software, utilities, or other types of software within the scope of the preferred embodiments. For example, the energy management code 122 may be a layer of the operating system 118 responsible for providing power management functions.

The energy management code 122 may comprise computer executable instructions maintained, for example, as a computer program product stored on a hard disk (e.g., on a DASD device 152) or system firmware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

In another embodiment, the energy management code 122 may be implemented in hardware via logic gates and/or other appropriate hardware techniques in lieu of, or in addition to, a processor-based system.

In the preferred embodiments of the present invention, the partition power policy wizard 124 (as well as the validation mechanism 126) includes instructions capable of executing on the processors 101 or statements capable of being interpreted by instructions executing on the processors 101 to perform the functions as further described below with reference to FIGS. 7-13. Also in accordance with the preferred embodiments of the present invention, the partition power policy wizard 124 (as well as the validation mechanism 126) may be instructions capable of executing on one or more processors of a networked device (e.g., the processor(s) 516 of the computer system 518 (shown in FIG. 5), or the processor(s) 616 of the computer system 618 (shown in FIG. 6)) or statements capable of being interpreted by instructions executing on such processor(s) of the networked device to perform the functions as further described below with reference to FIGS. 7-13.

In another embodiment, the partition power policy wizard 124 and/or the validation mechanism 126 may be implemented in hardware via logic gates and/or other appropriate hardware techniques in lieu of, or in addition to, a processor-based system.

While the partition power policy wizard 124 is shown as a separate component in FIG. 1 (along with the validation mechanism 126), the preferred embodiments expressly extend to the partition power policy wizard 124 and/or the validation mechanism 126 being implemented within the operating system 118, the partition management code 120, the energy management code 122, or application software, utilities, or other types of software within the scope of the preferred embodiments.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, partition management code 120, energy management code 122, partition power policy wizard 124, and validation mechanism 126, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100.

Operating system 118 is a multitasking operating system known in the industry as IBM i (formerly IBM i5/OS); however, those skilled in the art will appreciate that the spirit and scope of the present invention is not limited to any one operating system. The operating system 118, which is located in a single partition, is preferably designed to interface with open firmware, such as partition management firmware (e.g., a hypervisor, available from International Business Machines Corporation) and energy management firmware (e.g., IBM EnergyScale, available from International Business Machines Corporation).

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load computing-intensive processing from processors 101. However, those skilled in the art will appreciate that the present invention applies equally to computer systems that simply use I/O adapters to perform similar functions.

Mass storage interface 104 is used to connect mass storage devices (such as a direct access storage device 152) to computer system 100. One specific type of direct access storage device 152 is a readable and writable CD-RW drive, which may store data to and read data from a CD-RW 154.

Display interface 106 is used to directly connect one or more displays 156 to computer system 100. These displays 156, which may be non-intelligent (i.e., dumb) terminals or fully programmable workstations, are used to allow system administrators and users (also referred to herein as "operators" and "developers") to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems and/or workstations 158 to computer system 100 across a network 160. In accordance with the preferred embodiments of the present invention, the computer systems 158 may include a computer system on which a web browser program resides by which the partition power policy wizard 124 and the validation mechanism 126 may be accessed.

Also, in accordance with the preferred embodiments of the present invention, the computer systems 158 may include a computer system on which a hardware management console (HMC) resides (which computer system in turn is connected to a computer system on which resides an energy management tool). In such HMC-managed systems, as shown in FIG. 5, the partition power policy wizard 124 and/or the validation mechanism 126 may be integrated into, or operate in conjunction with, an energy management tool (e.g., Active Energy Manager (AEM) running within IBM Systems Director) in lieu of residing in the main memory 102 of the computer system 100 (as shown in FIG. 1).

Also, in accordance with the preferred embodiments of the present invention, the computer systems 158 may include a computer system on which an energy management tool resides. In such non-HMC managed systems, as shown in FIG. 6, the partition power policy wizard 124 and/or the validation mechanism 126 may be integrated into, or operate in conjunction with, an energy management tool (e.g., Active Energy Manager (AEM) running within IBM Systems Director) in lieu of residing in the main memory 102 of the computer system 100 (as shown in FIG. 1).

The present invention applies equally no matter how computer system 100 may be connected to other computer systems and/or workstations, regardless of whether the network connection 160 is made using present-day analog and/or digital techniques or via some networking mechanism of the future. In addition, many different network protocols can be used to implement a network. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while the description above is in the context of a fully functional computer system, those skilled in the art will appreciate that the partition power policy wizard 124 and the other software type entities described herein may be distributed as an article of manufacture (also referred to herein as a "computer program product") in a variety of forms, and the claims extend to all suitable types of computer-readable media used to actually carry out the distribution, including recordable type media such as floppy disks and CD-RWs (e.g., CD-RW 154 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein.

Operations of the different partitions in the computer system 100 may be controlled through a hardware management console (HMC), such as the hardware management console 518 (shown in FIG. 5). Hardware management console 518 is a separate computer system from which a system administrator may perform various functions including assignment of hardware resources to each logical partition, as well as real-location of resources to different partitions. IBM POWER6 processor-based systems, for example, can be managed by an HMC. Note that the term hardware management console (HMC) is used herein in a very broad sense to include any system and logical partition management utility that may be used to manage a logically partitioned computer system.

As noted above, in lieu of the partition power policy wizard 124 and/or the validation mechanism 126 residing in the main memory 102 of the computer system 100 (as shown in FIG. 1), the partition power policy wizard 124 and/or the validation mechanism 126 may reside in a memory and be executed by one or more processors of a separate computer system (as described further below with reference to FIGS. 5 and 6).

For example, in the HMC-managed embodiment shown in FIG. 5, an energy management tool 510 (e.g., IBM Systems Director Active Energy Manager), the partition power policy wizard 124, and the validation mechanism 126 reside in a memory 514 and are executed by one or more processors 516 of a computer system 518. The computer system 518 is connected indirectly to the multipartitioned computer system 100 (and to the other multipartitioned computer systems 100') through the hardware management console (HMC) 520. Active Energy Manager (AEM) is an energy management tool that typically runs within IBM Systems Director. IBM Systems Director is an integrated suite of tools that provides a platform management foundation for managing physical and virtual systems across a multi-system environment. The computer system 518 is connected to the HMC 520 by a network 530, while the HMC 520 is connected to the multipartitioned computer system 100 (and to the other multipartitioned computer systems 100') by a service network 540. Typically, the primary user interface for EnergyScale functions on a POWER6-based system (e.g., multipartitioned computer system 100) is Active Energy Manager (AEM) running within IBM Systems Director.

For example, as is conventional, a user at the computer system 518 can interact with the functions provided by the power management code (e.g., IBM EnergyScale) of the managed systems (i.e., multipartitioned computer system 100 and the other multipartitioned computer systems 100') by connecting IBM Systems Director to the HMC and using Active Energy Manager (AEM) to interact with the managed systems that the HMC exposes to IBM Systems Director. Included among these functions (e.g., EnergyScale functions) is the power management policy of each of the managed systems.

In accordance with the preferred embodiments of the present invention, with the partition power policy wizard 124 residing in memory on the computer system 518, the user at computer system 518 can utilize a graphical user interface (GUI) provided by the partition power policy wizard 124, as described further below with reference to FIGS. 9-13, to input power policy adherence information (e.g., whether each partition is to be impacted by the power management policy, and if so, by how much). The partition power policy wizard 124 uses the power policy adherence information to rebalance the processing units allocated to the individual partitions to limit the impact of the power management policy on a selected one or more of the partitions. Also in accordance with the preferred embodiments of the present invention, the validation mechanism 126 ensures the executability and/or advisability of the rebalanced allocation of processing units. In the above-described HMC-managed embodiment, both the partition power policy wizard 124 and the validation mechanism 126 preferably reside in memory 514 on the computer system 518.

In the non-HMC managed embodiment shown in FIG. 6, an energy management tool 610 (e.g., IBM Systems Director Active Energy Manager), the partition power policy wizard 124, and the validation mechanism 126 reside in a memory 614 and are executed by one or more processors 616 of a computer system 618. As mentioned above, Active Energy Manager (AEM) is an energy management tool that typically runs within IBM Systems Director. As also mentioned above, IBM Systems Director is an integrated suite of tools that provides a platform management foundation for managing physical and virtual systems across a multi-system environment. The computer system 618 is connected directly connected to the multipartitioned computer system 100 (and to the other multipartitioned computer systems 100') by a network 620. Typically, as mentioned above, the primary user interface for EnergyScale functions on a POWER6-based system (e.g., multipartitioned computer system 100) is Active Energy Manager (AEM) running within IBM Systems Director.

For example, as is conventional, IBM Systems Director residing in computer system 618 can establish a network connection to the managed systems' service processor (i.e., the service processor of the multipartitioned computer system 100 and the service processor of each of the other multipartitioned computer systems 100'), allowing a user at computer system 618 to utilize the Active Energy Manager interface to access the functions provided by the power management code (e.g., EnergyScale) of the managed systems (i.e., the multipartitioned computer system 100 and the other multipartitioned computer systems 100'). Included among these functions (e.g., EnergyScale functions) is the power management policy of each of the managed systems.

In accordance with the preferred embodiments of the present invention, with the partition power policy wizard 124 residing in memory on the computer system 618, the user at computer system 618 can utilize a graphical user interface (GUI) provided by the partition power policy wizard 124, as described further below with reference to FIGS. 9-13, to input power policy adherence information (e.g., whether each partition is to be impacted by the power management policy, and if so, by how much). The partition power policy wizard 124 uses the power policy adherence information to rebalance the processing units allocated to the individual partitions to limit the impact of the power management policy on a selected one or more of the partitions. Also in accordance with the preferred embodiments of the present invention, the validation mechanism 126 ensures the executability and/or advisability of the rebalanced allocation of processing units. In the above-described non-HMC managed embodiment, both the partition power policy wizard 124 and the validation mechanism 126 preferably reside in memory 614 on the computer system 618.

Figure 7:
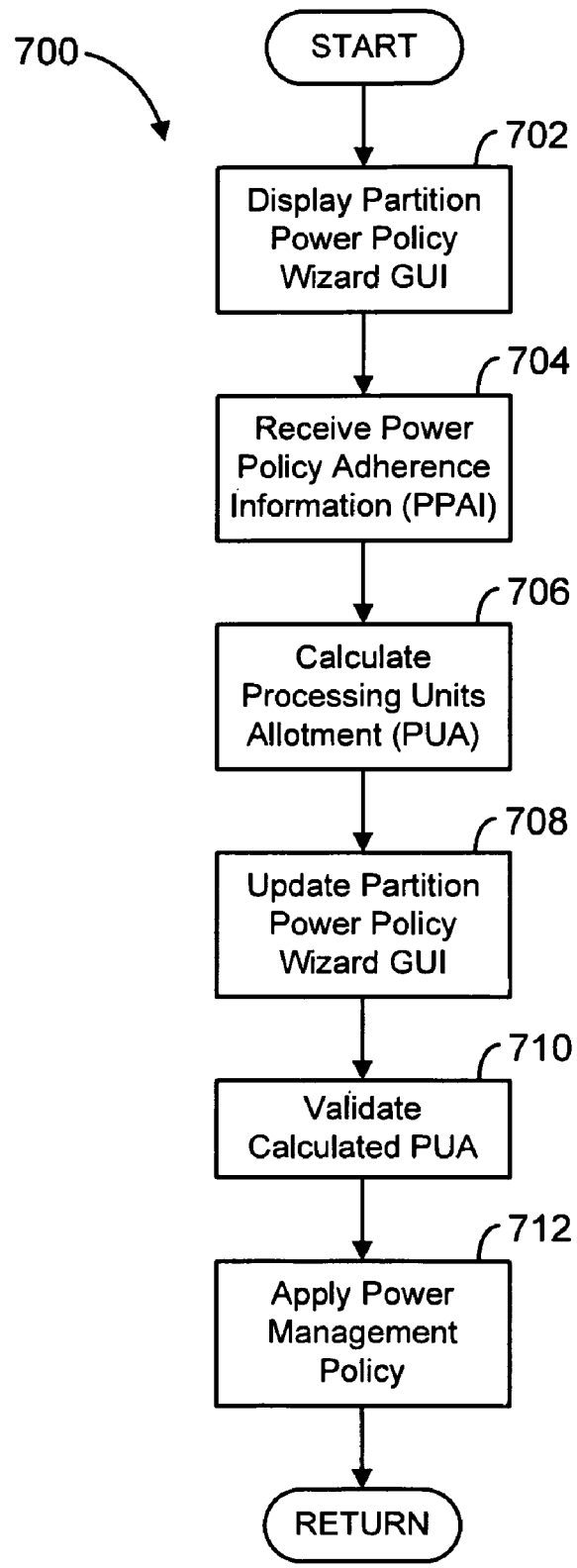
FIG. 7 is a flow diagram illustrating a method for applying power management on a partition basis in a multipartitioned computer system in accordance with the preferred embodiments of the present invention.

FIG. 7 is a flow diagram illustrating a method 700 for applying power management on a partition basis in a multi-partitioned computer system in accordance with the preferred embodiments of the present invention. In the method 700, the steps discussed below (steps 702-712) are performed. These steps are set forth in their preferred order. It must be understood, however, that the various steps may occur at different times relative to one another than shown, or may occur simultaneously. Moreover, those skilled in the art will appreciate that one or more of the steps may be omitted.

In accordance with the preferred embodiments of the present invention, the steps discussed below (steps 702-712) are performed when a power management policy (e.g., an EnergyScale function such as Static Power Saver, Dynamic Power Saver, power capping, soft power capping, etc.) is being set. For example, these steps may be performed when a user is utilizing a user interface provided by an energy management tool (e.g., Active Energy Manager) to enable the Dynamic Power Saver and configure its settings. In accordance with the preferred embodiments of the present invention, these steps may also be preformed during a logical partition deployment stage (e.g., assignment of hardware resources to each logical partition), or during a logical partition management stage (e.g., reallocation of hardware resources to different partitions).

In accordance with the preferred embodiments of the present invention, the steps discussed below (steps 702-712) are performed by a mechanism for applying power management on a partition basis in a multipartitioned computer system (e.g., the partition power policy wizard 124 and the validation mechanism 126 shown in FIGS. 1, 5 and 6), working in conjunction with partition management code (e.g., the partition management code 120 shown in FIG. 1) and energy management code (e.g., the energy management code 122 shown in FIG. 1) and, optionally, with a hardware management console (e.g., the hardware management console (HMC) 520 shown in FIG. 5) and/or an energy management tool (e.g., the energy management tool 510 shown in FIGS. 5 and 6, which typically runs within a systems director).

Any data required to perform the steps discussed below (steps 702-712) are passed between the mechanism for applying power management on a partition basis and the other entities listed above. Such data may include, for example, partition data passed from the partition management code, the hardware management console (if any), and the systems director (if any) to the partition power policy wizard and the validation mechanism; as well as the calculated processing unit allotment (PUA), user selections, validation data, and other data passed from the partition power policy wizard and the validation mechanism to the partition management code, the hardware management console (if any), and the systems director (if any). Such data may also include, for example, power management policy data passed from the energy management code, the hardware management console (if any), the systems director (if any), and the energy management tool (if any) to the partition power policy wizard and the validation mechanism; as well as the calculated processing unit allotment (PUA), user selections, validation data and other data passed from the partition power policy wizard and the validation mechanism to the energy management code, the hardware management console (if any), the systems director (if any), and the energy management tool (if any).

The method 700 begins when the partition power policy wizard displays a graphical user interface (GUI) (step 702). The partition power policy wizard GUI displayed in step 702 may be, for example, the partition power policy wizard GUI 900 (shown in FIGS. 9-11). In accordance with the preferred embodiments of the present invention, the partition power policy wizard GUI may be provided on the display 156 (shown in FIG. 1) of the computer system 100, the display of the computer system 518 (shown in FIG. 5), the display of the hardware management console 520 (shown in FIG. 5), the display of the computer system 618 (shown in FIG. 6), or some other networked device (e.g., on a display of a networked computer system running a web browser application).

Next, the method 700 continues with the partition power policy wizard receiving power policy adherence information (PPAI) (step 704). In accordance with the preferred embodiments of the present invention, the power policy adherence information (PPAI) is provided by a user utilizing the partition power policy wizard GUI displayed in step 702. Also in accordance with the preferred embodiments of the present invention, the power policy adherence information (PPAI) specifies whether each of a plurality of logical partitions is to be impacted by a power management policy, and if so, by how much. The power management policy may be, for example, a power management function that reduces an operating frequency of one or more processor(s) allocated to the logical partitions. For example, the power management policy may be an EnergyScale function such as Static Power Saver, Dynamic Power Saver, power capping, soft power capping, etc.

Figure 8:
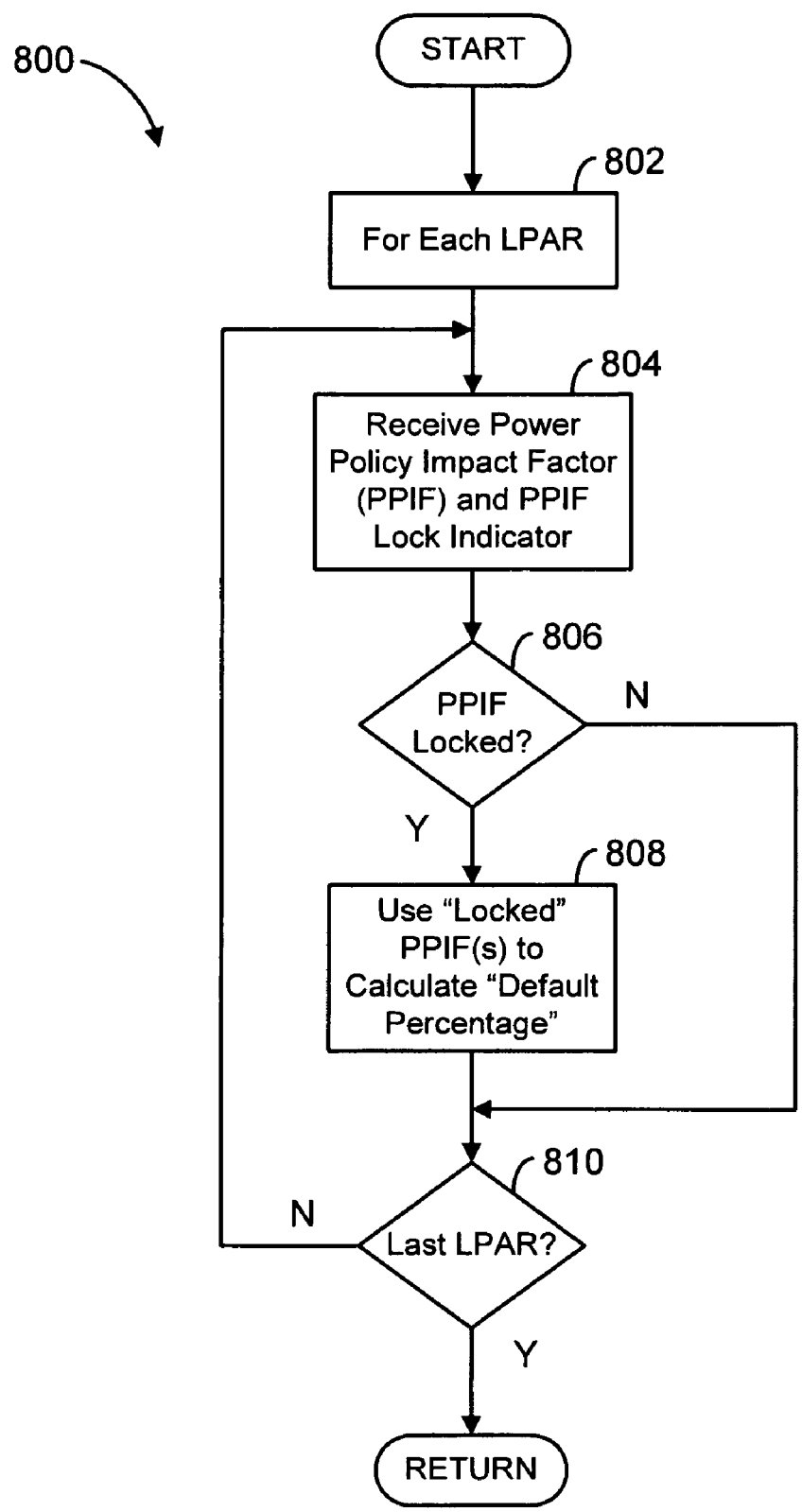
FIG. 8 is a flow diagram illustrating an exemplary mechanism for receiving power policy adherence information in accordance with the method illustrated in FIG. 7.

A flow diagram illustrating an exemplary mechanism for accomplishing step 704 is shown in FIG. 8, which is described further below. Briefly, in the exemplary mechanism shown in FIG. 8 and described in more detail below, the power policy adherence information (PPAI) includes, for each of the logical partitions, a power policy impact factor (PPIF), along with a PPIF lock indicator. Such an embodiment is shown in the partition power policy wizard GUI 900 (shown in FIGS. 9-11), with the power policy impact factor (PPIF) for each logical partition represented under the "Percent Cap Affects Partition" column and the PPIF lock indicator represented under the "Lock" column.

Alternatively, the power policy adherence information (PPAI) may include a power policy impact factor (PPIF) without a PPIF lock indicator. Such an alternative embodiment is shown in the partition power policy wizard GUI 1200 (shown in FIGS. 12-13), with the power policy impact factor (PPIF) for each logical partition represented under the "Percent Cap Affects Partition" column.

The method 700 continues with the partition power policy wizard calculating a processing units allotment (PUA) for each of the plurality of logical partitions based on the power policy adherence information (step 706). Preferably, as shown in FIGS. 7-8, the processing units allotment (PUA) for each of the plurality of logical partitions is calculated in step 706 after receiving the power policy adherence information (PPAI) for all of the logical partitions. In addition, an effective processing units (EPU) may be calculated as part of step 706; the effective processing units (EPU) is calculated for each of the plurality of logical partitions by multiplying the LPAR's processor efficiency (which is reduced for all LPARs due to the impact of the power management policy) and the calculated processing units allotment (PUA).

The processing units allotment (PUA) for each of the plurality of logical partitions may be calculated on an interim-basis after receiving the power policy adherence information (PPAI) for one or more logical partition using default values for the other logical partitions (i.e., the logical partitions for which power policy adherence information (PPAI) has not been received). For example, the default values may be based on an assumption that the other logical partitions will equally share the remaining processing units (i.e., the processing units that have not been allotted to the one or more logical partitions for which PPAI has been received). The processing units allotment (PUA) for each of the plurality of logical partitions so calculated on an interim-basis may be used to update the partition power policy wizard GUI (preferably, in a manner consistent with step 708, described below) and/or may be validated (preferably, in a manner consistent with step 710, described below).

Figure 11:
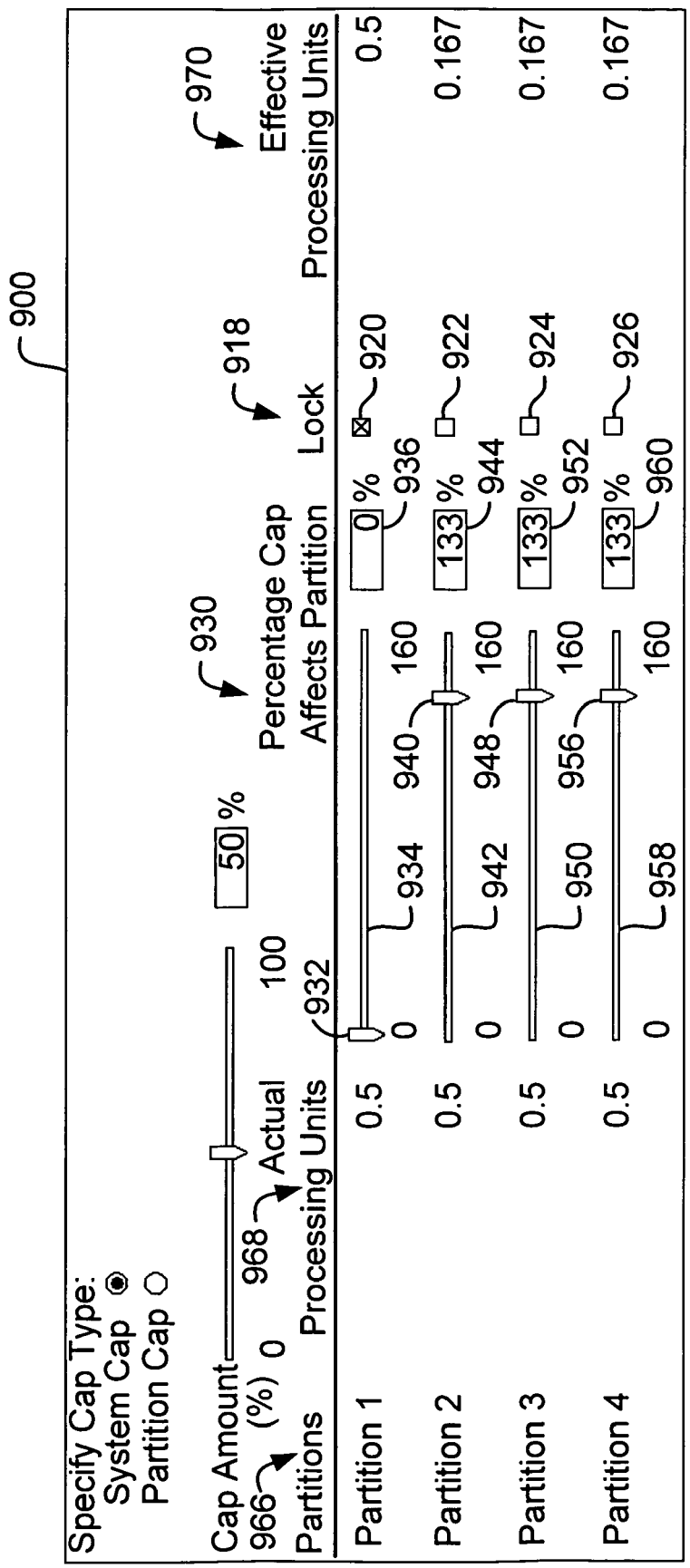

The method 700 continues with partition power policy wizard updating the partition power policy wizard GUI (step 708). The partition power policy wizard GUI is updated with the processing units allotment (PUA) and/or the effective processing units (EPU) for each of the plurality of logical partitions calculated in step 706. For example, as shown in FIG. 11, the partition power policy wizard GUI 900 may be updated to reflect the calculated effective processing units (EPU) for each of the logical partitions under the "Effective Processing Units" column.

The method 700 continues with validation mechanism validating the calculated processing units allotment (PUA) for each of the plurality of logical partitions (step 710). The processing units allotment (PUA) for each of the plurality of logical partitions calculated in step 706 may be, for example, validated with respect to its executability and/or advisability. For example, step 710 may implement a validation scheme ensuring that all user selections would yield partitions each having a processing units allotment (PUA) at or above a minimum processing capacity per processor (e.g., $\frac{1}{10}^{th}$ of a physical processor core). The validation scheme may also ensure that all user selections would yield partitions that process at or below system power limits. The validation scheme may include interaction with the user (e.g., prompts via the partition power policy wizard GUI). For example, such prompts may inform the user that under the current user selections, the efficiency of all partitions would drop or the processing units allotment (PUA) for one or more partitions is/are below a minimum processing capacity per processor.

The method 700 ends with the partition power policy wizard applying the power management policy to each of the plurality of logical partitions (step 712). The partition power policy wizard accomplishes this by applying the processing units allotment (PUA) for each of the plurality of logical partitions calculated in step 706. Step 712 is implemented by the partition power policy wizard working in conjunction with partition management code (e.g., the partition management code 120 shown in FIG. 1) and energy management code (e.g., the energy management code 122 shown in FIG. 1) and, optionally, with a hardware management console (e.g., the hardware management console (HMC) 520 shown in FIG. 5) and/or an energy management tool (e.g., the energy management tool 510 shown in FIGS. 5 and 6).

FIG. 8 is a flow diagram illustrating an exemplary mechanism 800 for accomplishing step 704 (shown in FIG. 7). In the exemplary mechanism 800, the steps discussed below (steps 802-810) are performed. These steps are set forth in their preferred order. It must be understood, however, that the various steps may occur at different times relative to one another than shown, or may occur simultaneously. Moreover, those skilled in the art will appreciate that one or more of the steps may be omitted.

The exemplary mechanism 800 begins upon completion of step 702 in method 700 (shown in FIG. 7), i.e., after the partition power policy wizard GUI is displayed. In the exemplary mechanism 800, the power policy adherence information (PPAI) includes, for each of the logical partitions (step 802), a power policy impact factor (PPIF) and a PPIF lock indicator.

The power policy impact factor (PPIF) for a given logical partition is received (step 804), along with a PPIF lock indicator. The received PPIF and the PPIF lock indicator for the given logical partition may be, for example, input by the user via the partition power policy wizard GUI. In accordance with the preferred embodiments of the present invention, if the user locks the PPIF for a given logical partition, the user cannot subsequently alter the PPIF for the given logical partition without first unlocking the PPIF for the given logical partition. The exemplary mechanism 800 then determines whether the PPIF lock indicator for the given logical partition indicates that the PPIF for the given logical partition is locked (step 806). If the PPIF lock indicator indicates the PPIF for the given logical partition is locked (step 806=Yes), then the partition power policy wizard uses the "locked" PPIF for the given logical partition (as well as the "locked" PPIF for any other logical partition(s)) in calculating a "default percentage" for any logical partition(s) having an "unlocked" PPIF (step 808). The default percentage is calculated by the partition power policy wizard, as described further below in the discussion of the partition power policy wizard GUI 900 shown in FIGS. 9-11.

Then, the exemplary mechanism 800 determines whether the given logical partition is the last of the partitions to be rebalanced (step 810). If the given logical partition is not the last of the partitions to be rebalanced (step 810=No), then the exemplary mechanism loops back to step 804.

On the other hand, at step 810, if exemplary mechanism 800 determines that the given logical partition is the last of the partitions to be rebalanced (step 810=Yes), then the exemplary mechanism 800 returns. That is, the exemplary mechanism 800 returns at step 706 in the method 700 (shown in FIG. 7).

Referring again to step 806, if the exemplary mechanism 800 determines that the PPIF lock indicator for the given logical partition indicates that the PPIF for the given logical partition is not locked (step 806=No), then the exemplary mechanism 800 skips to step 810.

The PPIF lock indicator is indicative of whether the PPIF for a given logical partition is locked. For example, referring temporarily to FIG. 11, a PPIF lock indicator may be shown in the partition power policy wizard GUI 900 for each of the logical partitions via the presence/absence of an "x" entry in a box under a "Lock" column. After having selected a PPIF for one or more particular logical partition(s), as described further below, if the user wants the PPIF for one or more of those particular logical partition(s) to be locked, the user selects this box in the row corresponding to the one or more logical partition(s) that are to have a "locked" PPIF. An "x" entry appears in each selected box. For example, the user may lock the PPIF of a first partition at 0% and lock the PPIF of a second partition at 50%. On the other hand, if the user wants the PPIF for one or more other logical partition(s) to be unlocked (e.g., the user is satisfied with the "default percentage" calculated by the partition power policy wizard), the user leaves this box unselected in the row corresponding to the one or more logical partition(s) that are to have an "unlocked" PPIF. No "x" entry appears in the unselected box. Hence, in accordance with exemplary mechanism 800, for each of the logical partitions, the partition power policy wizard receives the PPIF lock indicator provided by a user utilizing the partition power policy wizard GUI.

The power policy impact factor (PPIF) represents a percentage the power management policy is to affect a given logical partition. For example, referring temporarily to FIG. 11, a power policy impact factor (PPIF) may be shown in the partition power policy wizard GUI 900 for each of the logical partitions via a slide rule and/or a percentage entry in a box under a "Percentage Cap Affects Partition" column. As described above, if the user wants one or more particular logical partition(s) to be unaffected by the power management policy, the user slides a pointer on the slide rule to "0"

(i.e., 0%) or enters "0" (i.e., 0%) in the box under the "Percentage Cap Affects Partition" column, and then selects the box under the "Lock" column in the row corresponding to the unaffected logical partition(s). Similarly, if the user wants one or more particular logical partition(s) to be partially affected by the power management policy, the user slides a pointer on the slide rule to a particular value (e.g., 50%) or enters a particular value (e.g., 50%) in the box under the "Percentage Cap Affects Partition" column, and then selects the box under the "Lock" column in the row corresponding to the partially affected logical partition(s). On the other hand, as also described above, if the user wants one or more other logical partition(s) to utilize the "default percentage" calculated by the partition power policy wizard, the user leaves unselected the box under the "Lock" column in the row corresponding to the "default percentage" logical partition(s). No "x" entry appears in each such box. Hence, in accordance with exemplary mechanism 800, for each of the logical partitions, the partition power policy wizard receives the power policy impact factor (PPIF) provided by a user utilizing the partition power policy wizard GUI and/or calculates a default percentage.

As noted above, in the exemplary mechanism 800, the power policy adherence information (PPAI) includes, for each of the logical partitions (step 802), a power policy impact factor (PPIF) along with a PPIF lock indicator. In an alternative embodiment, the power policy adherence information (PPAI) may include a power policy impact factor (PPIF) without a PPIF lock indicator. For example, referring temporarily to FIG. 13, a power policy impact factor (PPIF) may be shown in the partition power policy wizard GUI 1200 for each of the logical partitions via a slide rule and/or a percentage entry in a box under a "Percentage Cap Affects Partition" column. If the user wants one or more particular logical partition(s) to be unaffected by the power management policy, the user may slide a pointer on the slide rule or enter a percentage in the box under the "Percentage Cap Affects Partition' column to "0" (i.e., 0%). On the other hand, if the user wants one or more other logical partition(s) to be affected by the power management policy, the user may accept a default percentage calculated by the partition power policy wizard, or may slide a pointer on the slide rule or enter a percentage in the box under the "Percentage Cap Affects Partition' column. Hence, in accordance with this alternative embodiment, for each of the logical partitions, the partition power policy wizard receives the power policy impact factor (PPIF) provided by a user utilizing the partition power policy wizard GUI and/or calculates a default percentage.

EXAMPLE 1

In Example 1, a computer system has one physical processor and four partitions, with each of the four partitions assigned to ¼ of the one physical processor. The computer system is subject to a power management policy that reduces its processing power to 50% of usual. For example, the power management policy may be a power cap that reduces the operating frequency of the one physical processor. On average, if the user takes no action, then each of the four partitions will be approximately 50% less efficient.

However, let us assume in this example that the user has selected one partition as not being affected by the power management policy and the user has selected the other three partitions as being affected by the power management policy by a default percentage. In accordance with the preferred embodiments of the present invention, the user accomplishes these selections by interacting with a partition power policy wizard GUI (e.g., the partition power policy wizard GUI 900 shown in FIGS. 9-11).

In this example, because default percentages are used for each of the three affected partitions, the user need only provide the power policy impact factor (PPIF) (i.e., 0%) and the PPIF lock indicator (i.e., "locked") for the unaffected partition and the PPIF lock indicator (i.e., "unlocked") for the other three partitions. For example, under a "Percentage Cap Affects Partition" column in the partition power policy wizard GUI, the user may slide a pointer (e.g., 932 in FIG. 11) on a slide rule (e.g., 934 in FIG. 11) to "0" (i.e., 0%) or enter "0" (i.e., 0%) in a box (e.g., 936 in FIG. 11) in a row corresponding to the unaffected partition. Then, under a "Lock" column in the partition power policy wizard GUI, the user may select a box (e.g., 920 in FIG. 11) in a row corresponding to the unaffected partition and leave unselected a box (e.g., 922, 924 and 926 in FIG. 11) in each row corresponding to one of the three affected partitions. The power policy impact factor (PPIF) for the unaffected partition is locked at 0% (e.g., 936 in FIG. 11). The power policy impact factor (PPIF) for each of the affected partitions is the default percentage, which is calculated by the partition power policy wizard. In this example, the default percentage for each of the affected partitions is 133% (e.g., 944, 952 and 960 in FIG. 11). The default percentage is calculated as follows:

$$PPIF_{d,affected} = PPIF_{o,affected} + 1/n(PPIF_{o,unaffected}) = 100\% + \frac{1}{3}(100\%) = 133\%$$

where $PPIF_{d,affected}$ is the default power policy impact factor for each of the affected partitions, $PPIF_{o,affected}$ is the original power policy impact factor for each of the affected partitions (before the user selected the unaffected partition as being unaffected), n is the number of affected partitions, and $PPIF_{o,unaffected}$ is the original power policy impact factor for the unaffected partition (before the user selected it as being unaffected).

Then, in order to maintain the same amount of processing for the unaffected partition, in spite of the 50% reduction in processing power, the amount of processing units assigned to the unaffected partition would need to double (i.e., from ¼ of the one physical processor to ½ of the physical processor). Thus, the processing units allotment (PUA) for the unaffected partition is 0.500. In response, the three affected partitions' processing units would need to be reduced (by a total of ¼ of the physical processor, i.e., ½-¼) equally to ensure all four partitions are assigned no more than one full physical processor—each of the three affected partition's processing units would need to be reduced from ¼ of the one physical processor to ⅙ of the physical processor {i.e., ¼-(⅓)(¼)}. Hence, the processing units allotment (PUA) for each of the three affected partitions is 0.167.

After rebalancing the processing units allotment (PUA) for each of the four partitions, when the power management policy is applied, the processing units in the unaffected partition will function at 50% efficiency, but the partition will have been given twice the processing units. Consequently, the increased processing units in the unaffected partition will cause the unaffected partition to execute just as well as before the power management policy was applied. That is, the unaffected partition's effective processing units (EPU) {EPU=efficiency×PUA} will be equal to its actual processing units (APU) before the power management policy was applied. The processing units in the three affected partitions will also function at 50% efficiency, but the affected partitions will perform much worse because their processing units have been reduced to ensure that the unaffected partition is not impacted by the power management policy.

EXAMPLE 2

In Example 2, a computer system has one physical processor and four partitions, with each of the four partitions assigned to ¼ of the one physical processor. The computer system is subject to a power management policy that reduces its processing power to 50% of usual. For example, the power management policy may be a power cap that reduces the operating frequency of the one physical processor. On average, if the user takes no action, then each of the four partitions will be approximately 50% less efficient.

However, let us assume in this example that the user has selected one partition as being only partially affected by the power management policy and the user has selected the other three partitions to utilize the default percentage calculated by the partition power policy wizard. In accordance with the preferred embodiments of the present invention, the user accomplishes these selections by interacting with a partition power policy wizard GUI (e.g., the partition power policy wizard GUI 900 shown in FIGS. 9-11).

In this example, because default percentages are used for three partitions, the user need only provide the power policy impact factor (PPIF) (i.e., 50%) and the PPIF lock indicator (i.e., "locked") for the partially affected partition and the PPIF lock indicator (i.e., "unlocked") for the other three partitions. For example, under a "Percentage Cap Affects Partition" column in the partition power policy wizard GUI, the user may slide a pointer (e.g., 932 in FIG. 11) on a slide rule (e.g., 934 in FIG. 11) to "50" (i.e., 50%) or enter "50" (i.e., 50%) in a box (e.g., 936 in FIG. 11) in a row corresponding to the partially affected partition. Then, under a "Lock" column in the partition power policy wizard GUI, the user may select a box (e.g., 920 in FIG. 11) in the row corresponding to the partially affected partition and leave unselected a box in the rows respectively corresponding to the other three partitions.

The power policy impact factor (PPIF) for the partially affected partition is selected by the user. In this example, the user selects 50%. Hence, the one partially affected partition will be 50% impacted by the power management policy, i.e., midway between unaffected (0%) and fully affected (100%). The power policy impact factor (PPIF) for each of the three "default percentage" partitions is the default percentage, which is calculated by the partition power policy wizard. In this example, the default percentage for each of these three partitions is 117%. The default percentage is calculated as follows:

$$PPIF_d = PPIF_o + 1/n(PPIF_{o,partially\_affected} - PPIF_{partially\_affected}) =$$
$$100\% + 1/3(100\% - 50\%) = 117\%$$

where $PPIF_d$ is the default power policy impact factor for each of the "default percentage" partitions, $PPIF_o$ is the original power policy impact factor for each of the "default percentage" partitions (before the user selected the partially affected partition as being partially affected), n is the number of "default percentage" partitions, $PPIF_{o,partially\_affected}$ is the original power policy impact factor for the partially affected partition (before the user selected it as being partially affected), and $PPIF_{partially\_affected}$ is the power policy impact factor for the partially affected partition as selected by the user.

Then, in order to provide the desired amount of processing for the partially affected partition, in spite of the 50% reduction in processing power, the amount of processing units assigned to the partially affected partition would need to increase by a factor of 1.5 (i.e., from ¼ of the one physical processor to ⅜ of the physical processor). Thus, the processing units allotment (PUA) for the partially affected partition is 0.375. In response, the other three partitions' processing units would need to be reduced (by a total of ⅛ of the physical processor, i.e., ⅜–¼) equally to ensure all four partitions are assigned no more than one full physical processor—each of these three partition's processing units would need to be reduced from ¼ of the one physical processor to 5/24 of the physical processor {i.e., ¼–(⅓)(⅛)}. Hence, the processing units allotment (PUA) for each of the three "default percentage" partitions is 0.208.

After rebalancing the processing units allotment (PUA) for each of the four partitions, when the power management policy is applied, the processing units in the partially affected partition will function at 50% efficiency, but the partially affected partition will have been given 1.5 times the processing units. Consequently, the increased processing units in the partially affected partition will cause the partially affected partition to execute 75% as efficiently as before the power management policy was applied. That is, the partially affected partition's effective processing units (EPU) {EPU=efficiency×PUA} will be equal to 75% of its actual processing units (APU) before the power management policy was applied. The processing units in the other three partitions will also function at 50% efficiency, but these three partitions will perform much worse because their processing units have been reduced to ensure that the partially affected partition is not fully impacted by the power management policy.

Figure 9:
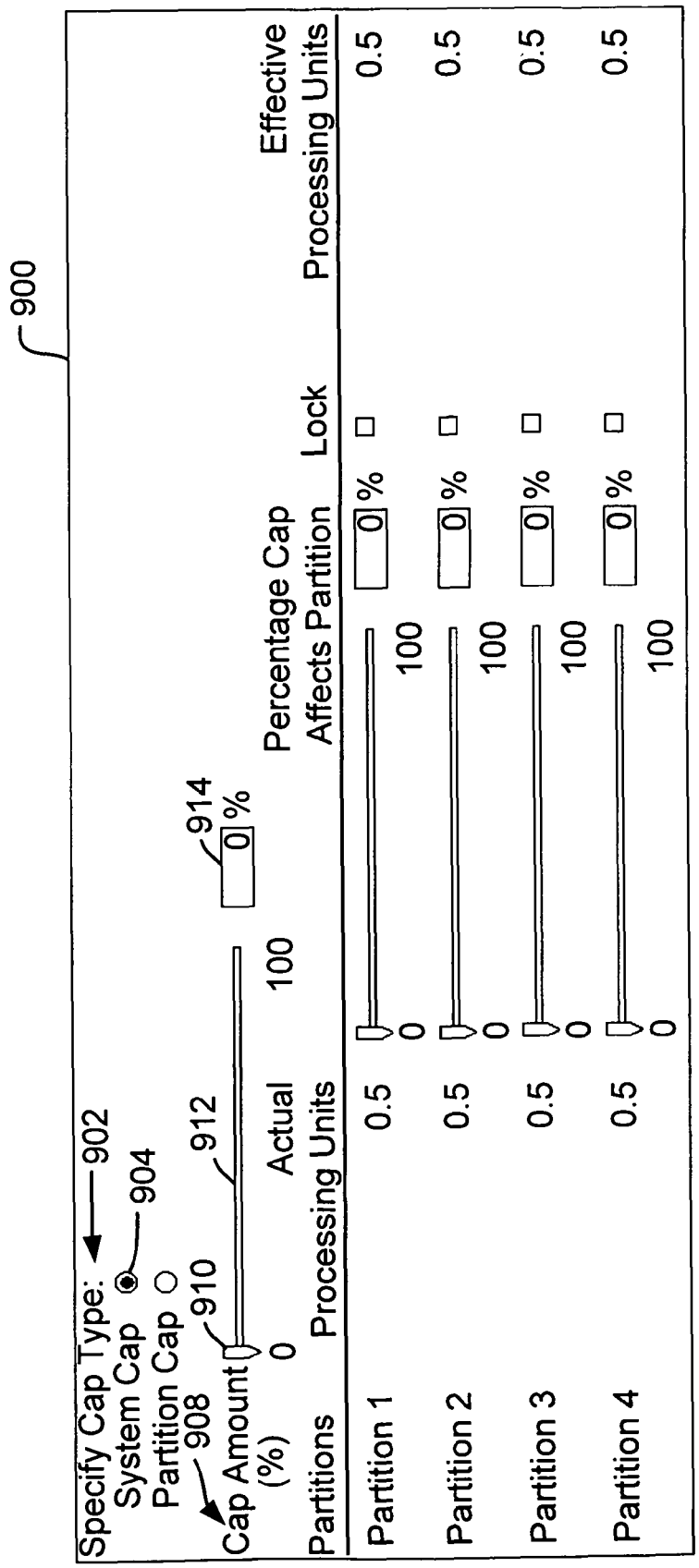
FIGS. 9-11 are screen shots illustrating an exemplary partition power policy wizard graphical user interface (GUI) at different stages in accordance with the preferred embodiments of the present invention. In the partition power policy wizard GUI shown in FIGS. 9-11, a system cap has been selected as the cap type. In the stage shown in FIG. 9, no cap amount has been selected. In the stage shown in FIG. 10, a 50% cap amount has been selected. In the stage shown in FIG. 11, a 50% cap amount remains selected, and power policy adherence information has been input under a "Percentage Cap Affects Partition" column.
Figure 10:
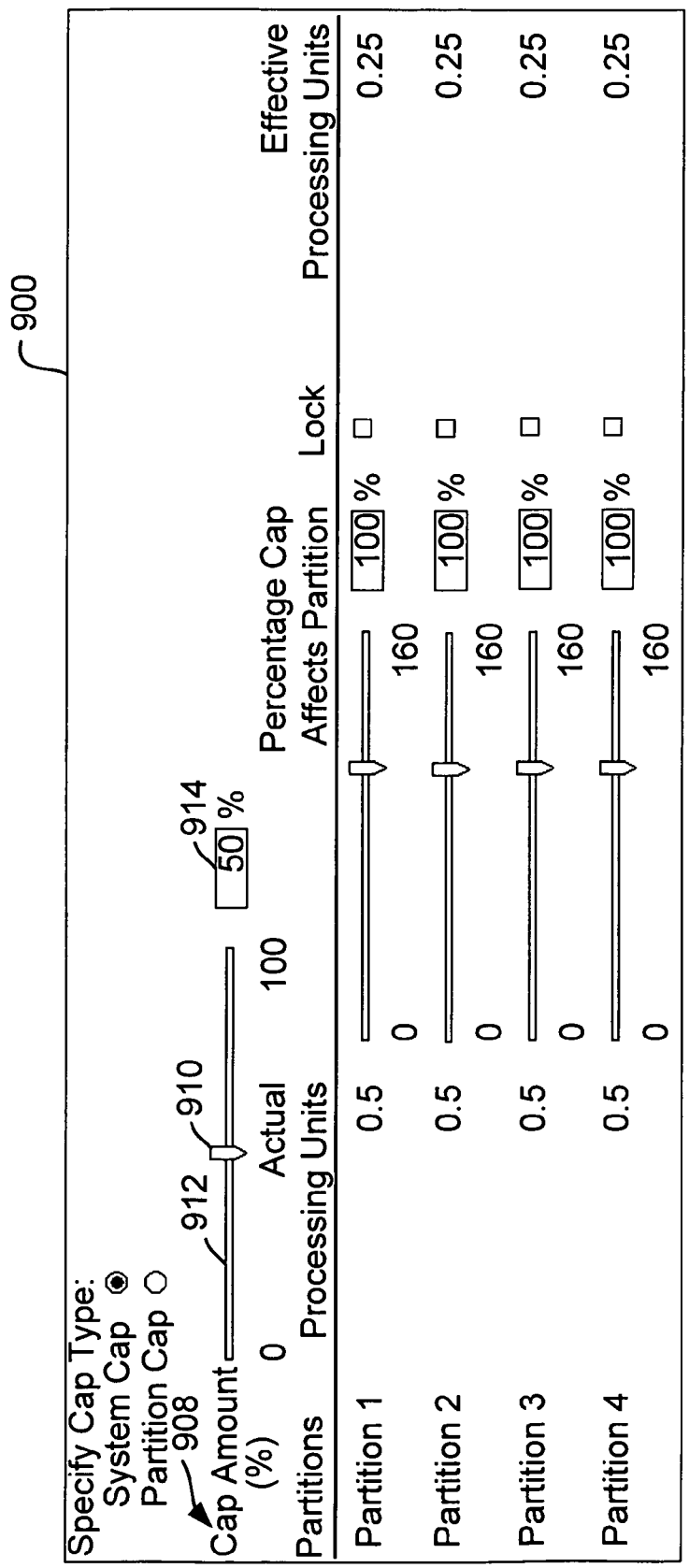

FIGS. 9-11 are screen shots illustrating an exemplary partition power policy wizard graphical user interface (GUI) 900 at different stages in accordance with the preferred embodiments of the present invention. In the partition power policy wizard GUI 900 shown in FIGS. 9-11, a system cap has been selected as the power cap type. Under a "Specify Cap Type:" heading 902, a user has selected a "System Cap" radio button 904.

Assume in this example that a computer system with two CPUs has four logical partitions defined, with 50% of a logical CPU allocated to each partition. In other words, the actual processing units (APU) assigned for each partition is 0.500 before the application of a power management policy.

In the stage shown in FIG. 9, no cap amount has been selected. Adjacent to a "Cap Amount (%)" heading 908, a pointer 910 on a slide rule 912 and a data box 914 are set at "0" (0%).

In the stage shown in FIG. 10, a 50% cap amount has been selected. Adjacent to the "Cap Amount (%)" heading 908, the pointer 910 on the slide rule 912 and the box 914 are set at "50" (50%).

In the stage shown in FIG. 11, a 50% cap amount remains selected, power policy adherence information has been input under the "Percentage Cap Affects Partition" column 930. Partition_1 is to be unaffected by the power cap. Hence, under the "Percentage Cap Affects Partition" column 930 the user has moved a pointer 932 on a slide rule 934 to "0" (0%) or entered "0" (0%) in a box 936, and under the "Lock" column 918, the user has selected the box 920 for Partition_1. Partition_2, Partition_3 and Partition_4 are to be affected by the power cap. Hence, under the "Lock" column 918, the user has not selected the boxes 922, 924 and 926 for Partition_2, Partition_3 and Partition_4, respectively.

Because Partition_1 is to be unaffected by the power cap, under a "Percentage Cap Affects Partition" header 930, a pointer 932 on a slide rule 934 and a data box 936 for Partition_1 are locked at "0" (0%). The user either moved the pointer 932 to "0" or entered "0" in the box 936, and then selected the box 920 under the "Lock" column 918. Also, under the "Percentage Cap Affects Partition" header 930, a pointer 940 on a slide rule 942 and a data box 944 for Partition_2 are set at a default percentage of "133" (133%). Likewise, under the "Percentage Cap Affects Partition" header 930, a pointer 948 on a slide rule 950 and a data box 952 for Partition_3 are set at a default percentage of "133" (133%); and a pointer 956 on a slide rule 958 and a data box 960 for Partition_4 are set at a default percentage of "133" (133%).

Under a "Partitions" column 966, the four partitions are listed. Under an "Actual Processing Units" column 968, the actual processing units (APU) before the power management policy was applied for the partitions is shown as follows: Partition_1 APU=0.500; Partition_2 APU=0.500; Partition_3 APU=0.500; and Partition_4 APU=0.500. Under an "Effective Processing Units" column 970, the effective processing units (EPU) for the partitions is shown as follows: Partition_1 EPU=0.500; Partition_2 EPU=0.0167; Partition_3 EPU=0.0167; and Partition_4 EPU=0.167. Note that for unaffected partitions, such as Partition_1, the APU=EPU.

Figure 12:
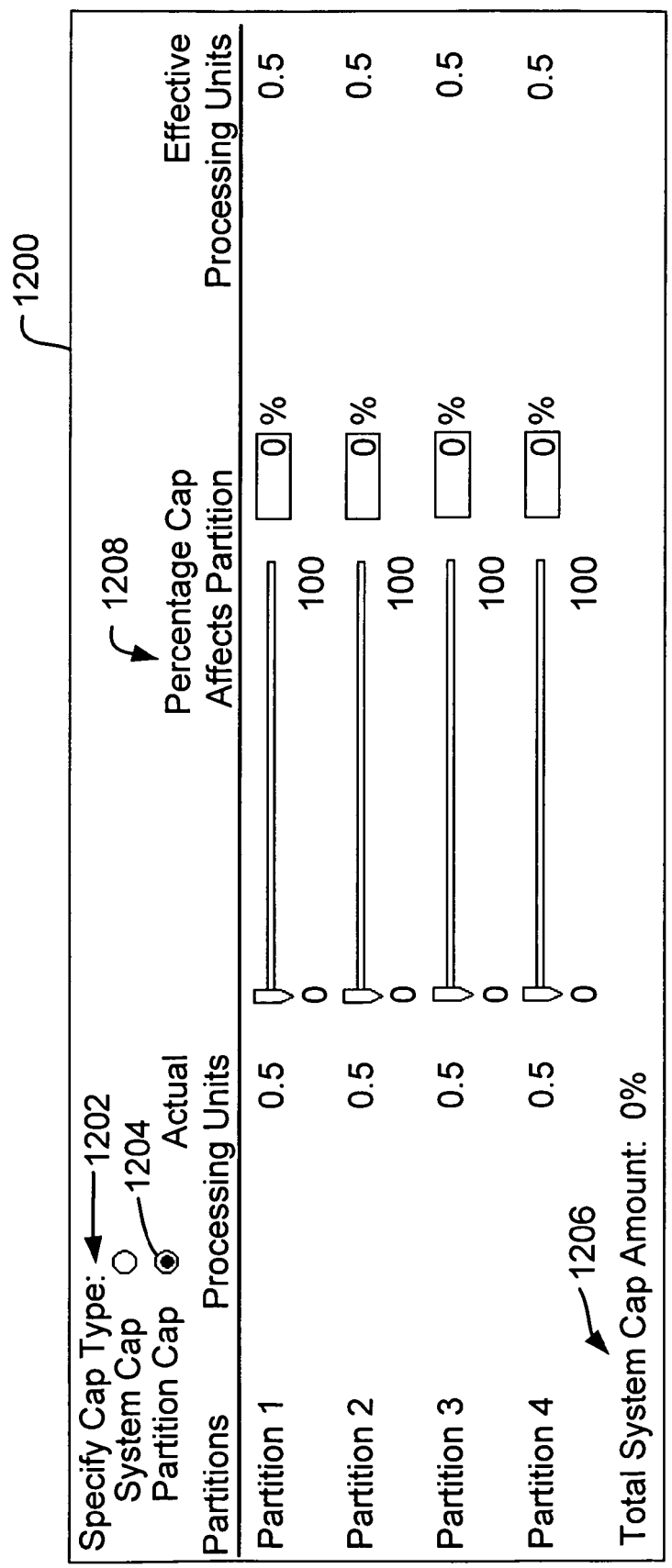
FIGS. 12-13 are screen shots illustrating another exemplary partition power policy wizard graphical user interface (GUI) at different stages in accordance with the preferred embodiments of the present invention. In the partition power policy wizard GUI shown in FIGS. 12-13, a partition cap has been selected as the cap type. In the stage shown in FIG. 12, no power policy adherence information has been input under a "Percentage Cap Affects Partition" column such that there is no system cap. In the stage shown in FIG. 13, power policy adherence information has been input under the "Percentage Cap Affects Partition" column such that a system cap is 50%.
Figure 13:
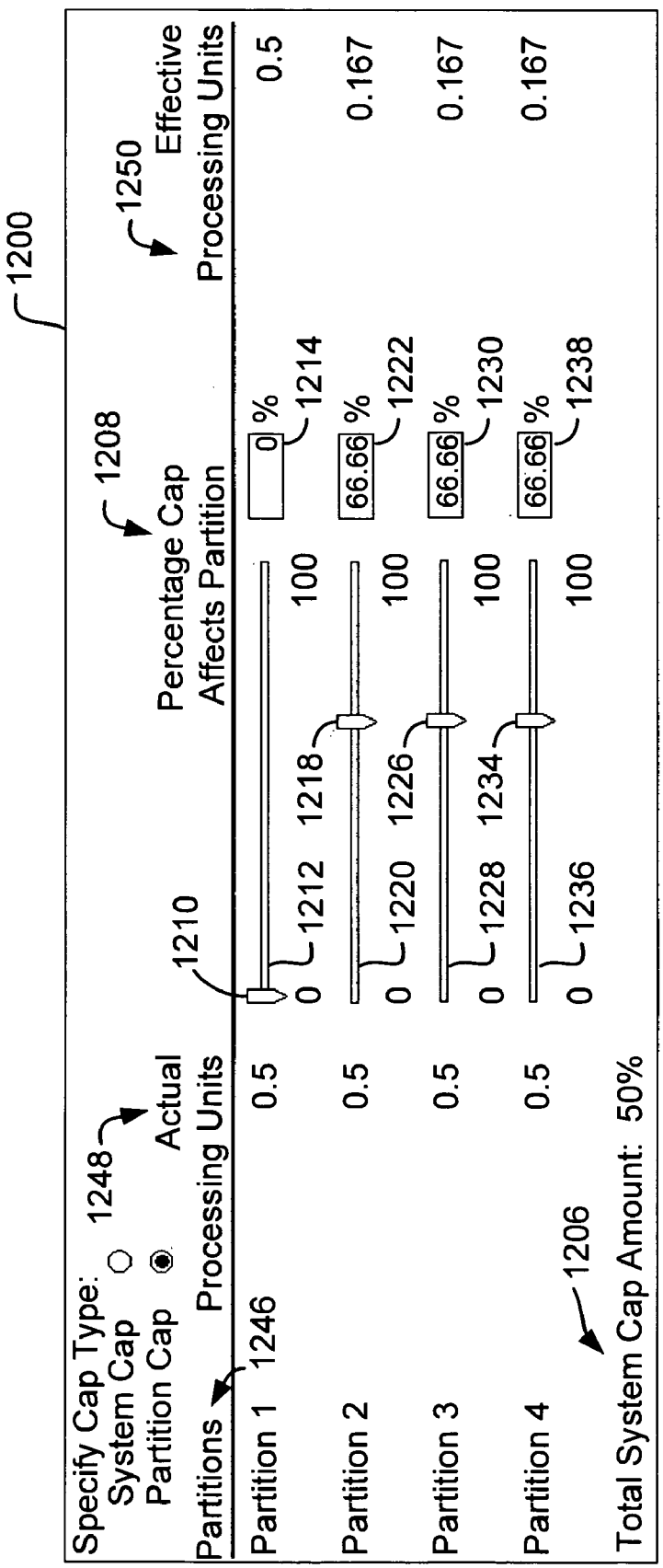

FIGS. 12-13 are screen shots illustrating another exemplary partition power policy wizard graphical user interface (GUI) at different stages in accordance with the preferred embodiments of the present invention. In the partition power policy wizard GUI shown in FIGS. 12-13, a partition cap has been selected as the cap type. Under "Specify Cap Type:" heading 1202, a user has selected a "Partition Cap" radio button 1204.

Assume in this example that a computer system with two CPUs has four logical partitions defined, with 50% of a logical CPU allocated to each partition. In other words, the actual processing units (APU) assigned for each partition is 0.500 before the application of a power management policy.

In the stage shown in FIG. 12, no power policy adherence information has been input under a "Percentage Cap Affects Partition" column 1208 such that there is no system cap. Adjacent to a "Total Systems Cap Amount:" heading 1206, a data field reads "0%".

In the stage shown in FIG. 13, power policy adherence information has been input under the "Percentage Cap Affects Partition" column 1208 such that a system cap is 50%. One partition is not to be capped, while three partitions are to be capped equally such that the system cap is 50%. Adjacent to the "Total Systems Cap Amount:" heading 1206, a data field reads "50%".

Under the "Percentage Cap Affects Partition" column 1208, a pointer 1210 on a slide rule 1212 and a data box 1214 for Partition_1 are set at "0" (0%). The user either moved the pointer 1212 to "0" or entered "0" in the data box 1214. Also, under the "Percentage Cap Affects Partition" header 1208, a pointer 1218 on a slide rule 1220 and a data box 1222 for Partition_2 are set at "66.66" (66.66%). Likewise, under the "Percentage Cap Affects Partition" header 1208, a pointer 1226 on a slide rule 1228 and a data box 1230 for Partition_3 are set at "66.66" (66.66%); and a pointer 1234 on a slide rule 1236 and a data box 1238 for Partition_4 are set at "66.66" (66.66%). In each case, the user either moved the pointer 1218, 1226, 1234 to "66.66" or entered "66.66" in the data box 1222, 1230, 1238.

Under a "Partitions" column 1246, the four partitions are listed. Under an "Actual Processing Units" column 1248, the actual processing units (APU) before the power management policy was applied for the partitions is shown as follows: Partition_1 APU=0.500; Partition_2 APU=0.500; Partition_3 APU=0.500; and Partition_4 APU=0.500. Under an "Effective Processing Units" heading 1250, the effective processing units (EPU) for the partitions is shown as follows: Partition_1 EPU=0.500; Partition_2 EPU=0.167; Partition_3 EPU=0.167; and Partition_4 EPU=0.167. Note that for unaffected partitions, such as Partition_1, the APU=EPU.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. A computer system, comprising:
   at least one processor;
   a memory coupled to the at least one processor;
   a partition power policy wizard residing in the memory and executed by one or more of the at least one processor, the partition power policy wizard receiving power policy adherence information for one or more of a plurality of logical partitions and calculating a processing units allotment (PUA) for each of the plurality of logical partitions based on the power policy adherence information, wherein the partition power policy wizard receives the power policy adherence information for each of the plurality of logical partitions, and wherein the power policy adherence information for a given one of the plurality of logical partitions includes a power policy impact factor (PPIF) for the given logical partition representing a percentage the power management policy is to affect the given logical partition.

2. The computer system as recited in claim 1, wherein the power policy adherence information is provided by a user utilizing a graphical user interface (GUI).

3. The computer system as recited in claim 1, wherein one or more of the at least one processor is allocated to the plurality of logical partitions, and wherein a power management policy is applied to the plurality of logical partitions and includes a step of reducing an operating frequency of the one or more processor(s) allocated to the plurality of logical partitions.

4. The computer system as recited in claim 1, wherein the computer system is coupled, directly or indirectly, to one or more multipartitioned server(s) containing one or more processor(s) allocated to the plurality of logical partitions, wherein the partition power policy wizard is a component of or operates in conjunction with an energy management tool for managing the energy consumption of the one or more multipartitioned server(s), and wherein the energy management tool applies a power management policy that includes a step of reducing an operating frequency of the one or more one processor(s) of the one or more multipartitioned server(s) allocated to the plurality of logical partitions.

5. The computer system as recited in claim 1, wherein the power policy adherence information for a given one of the plurality of logical partitions includes the power policy impact factor (PPIF) for the given logical partition, as well as a PPIF lock indicator for the given logical partition.

6. The computer system as recited in claim 1, wherein the partition power policy wizard includes a validation mechanism to validate the processing units allotment (PUA) calculated for each of the plurality of logical partitions.

7. A computer-implemented method for applying power management on a partition basis in a multipartitioned computer system, comprising the steps of:
- receiving power policy adherence information for one or more of a plurality of logical partitions in the multipartitioned computer system, wherein the receiving step includes a step of receiving the power policy adherence information for each of the plurality of logical partitions, wherein the power policy adherence information for a given one the plurality of logical partitions includes a power policy impact factor (PPIF) for the given logical partition representing a percentage a power management policy is to affect the given logical partition;
- calculating a processing units allotment (PUA) for each of the plurality of logical partitions based on the power policy adherence information; and
- applying the power management policy to the plurality of logical partitions, wherein the step of applying the power management policy includes a step of reducing an operating frequency of at least one processor which is allocated to the plurality of logical partitions.

8. The computer-implemented method as recited in claim 7, further comprising the step of:
- displaying a graphical user interface (GUI) to a user by which the user inputs the power policy adherence information.

9. The computer-implemented method as recited in claim 7, wherein the power policy adherence information for a given one the plurality of logical partitions includes the power policy impact factor (PPIF) for the given logical partition, as well as a PPIF lock indicator for the given logical partition.

10. The computer-implemented method as recited in claim 9, further comprising the step of:
- displaying a graphical user interface (GUI) to a user by which the user at least one of inputs and verifies for each of the plurality of logical partitions the power policy impact factor (PPIF) and the PPIF lock indicator.

11. The computer-implemented method as recited in claim 7, further comprising the step of:
- displaying a graphical user interface (GUI) to a user by which the user at least one of inputs and verifies for each of the plurality of logical partitions the power policy impact factor (PPIF).

12. The computer-implemented method as recited in claim 7, further comprising the step of:
- validating the processing units allotment (PUA) calculated for each of the plurality of logical partitions.

13. A computer program product for applying power management on a partition basis in a multipartitioned computer system, comprising:
- a plurality of executable instructions provided on a non-transitory computer readable media, wherein the executable instructions, when executed by at least one processor in a digital computing device, cause the digital computing device to perform the steps of:
  - receiving power policy adherence information for one or more of a plurality of logical partitions, wherein at least one processor is allocated to the plurality of logical partitions, wherein the receiving step includes a step of receiving the power policy adherence information for each of the plurality of logical partitions, wherein the power policy adherence information for a given one the plurality of logical partitions includes a power policy impact factor (PPIF) for the given logical partition representing a percentage a power management policy is to affect the given logical partition;
  - calculating a processing units allotment (PUA) for each of the plurality of logical partitions based on the power policy adherence information; and
  - applying the power management policy to the plurality of logical partitions, wherein the step of applying the power management policy includes a step of reducing an operating frequency of the at least one processor.

14. The computer program product as recited in claim 13, wherein the executable instructions, when executed by the at least one processor in the digital computing device, cause the digital computing device to further perform the step of:
- displaying a graphical user interface (GUI) to a user by which the user at least one of inputs and verifies for each of the plurality of logical partitions the power policy adherence information.

15. The computer program product as recited in claim 13, wherein the executable instructions, when executed by the at least one processor in the digital computing device, cause the digital computing device to further perform the step of:
- displaying a graphical user interface (GUI) to a user by which the user at least one of inputs and verifies for each of the plurality of logical partitions the power policy impact factor (PPIF).

16. The computer program product as recited in claim 13, wherein the executable instructions, when executed by the at least one processor in the digital computing device, cause the digital computing device to further perform the step of:
- validating the processing units allotment (PUA) calculated for each of the plurality of logical partitions.

* * * * *